United States Patent
Conlin et al.

(10) Patent No.: US 6,212,597 B1
(45) Date of Patent: Apr. 3, 2001

(54) APPARATUS FOR AND METHOD OF ARCHITECTURALLY ENHANCING THE PERFORMANCE OF A MULTI-PORT INTERNALLY CACHED (AMPIC) DRAM ARRAY AND LIKE

(75) Inventors: Richard Conlin, Franklin; Tim Wright, Framingham; Peter Marconi, Franklin; Mukesh Chatter, Hopkinton, all of MA (US)

(73) Assignee: NeoNet LLLC, Marlboro, MA (US)

( * ) Notice: Subject to any disclaimer, the term of this patent is extended or adjusted under 35 U.S.C. 154(b) by 0 days.

(21) Appl. No.: 08/901,502

(22) Filed: Jul. 28, 1997

(51) Int. Cl.[7] ..................................... G06F 12/00
(52) U.S. Cl. .................. 711/105; 711/149; 711/168; 711/150; 710/20; 710/21; 710/38
(58) Field of Search ...................... 711/105, 131, 711/149, 150, 168; 395/840, 841, 821, 853, 858, 200.42

(56) References Cited

U.S. PATENT DOCUMENTS

| | | | |
|---|---|---|---|
| 5,410,540 | * | 4/1995 | Aiki et al. ................ 370/60 |
| 5,802,580 | * | 9/1998 | McAlpine ................ 711/149 |
| 5,875,470 | * | 2/1999 | Dreibelbis ................ 711/147 |

* cited by examiner

Primary Examiner—Eddie P. Chan
Assistant Examiner—Kimberly McLean
(74) Attorney, Agent, or Firm—Rines and Rines

(57) ABSTRACT

Apparatus for and method of enhancing the performance of multi-port internal cached DRAMs and the like by providing for communicating to system I/O resources messages sent by other such resources and the message location within the DRAM array, and further providing for efficient internal data bus usage in accommodating for both small and large units of data transfer.

38 Claims, 11 Drawing Sheets

APPARATUS FOR AND METHOD OF ARCHITECTURALLY ENHANCING THE PERFORMANCE OF A MULTI-PORT INTERNALLY CACHED (AMPIC) DRAM ARRAY AND LIKE

FIELD OF INVENTION

The present invention relates to dynamic random access memories, known as DRAM structures, being more particularly directed to multi-port internally cached versions thereof providing very high system bandwidth to memory to a large number of system input/output (I/O) resources by moving large blocks of data internally, as described in copending U.S. patent application Ser. No. 581,467, filed Dec. 29, 1995, for High Performance Universal Multi Port Internally Cached Dynamic Random Access Memory System, Architecture and Method, by Mukesh Chatter now U.S. Pat. No. 5,799,209, one of the co-inventors herein, and to enhanced architectures and improvements in the operation of same.

BACKGROUND OF INVENTION

A multi-port internally cached DRAM, termed AMPIC DRAM, of said copending application, later reviewed in connection with hereinafter described FIG. 1, is designed for high system bandwidth use in a system having a master controller, such as a central processing unit (CPU), having parallel data ports and a dynamic random access memory each connected to and competing for access to a common system bus interface. It provides an improved DRAM architecture comprising the multi-port internally cached DRAM that, in turn, encompasses a plurality of independent serial data interfaces each connected between a separate external I/O resource and internal DRAM memory through corresponding buffers; a switching module interposed between the serial interfaces and the buffers; and a switching module logic control for connecting of the serial interfaces to the buffers under a dynamic configuration by the bus master controller, such as said CPU, for switching allocation as appropriate for the desired data routability. This technique provides for the transfer of blocks of data internal to the memory chip, orders of magnitude faster than traditional approaches, and eliminates current system bandwidth limitations and related problems, providing significantly enhanced system performance at a reduced cost, and enabling substantially universal usage for many applications as a result of providing unified memory architecture.

In said co-pending application, a large number of system I/O resources may be supported, each with a wide data bus, while still maintaining low pin counts in the AMPIC DRAM device, as by stacking several such devices, later illustrated in connection with hereinafter described FIG. 2, with the number of system I/O resources supported, and the width of each system I/O resource bus being limited only by the technology limitations.

While such architectures, as previously stated and as described in said copending application, admirably provide a very large amount of bandwidth for each system I/O resource to access the DRAM, the system does not provide a mechanism by which one system I/O resource may send data to another system I/O resource—an improvement now provided by the present invention. As an example, if system I/O resource In has a multi-bit message that should be sent to system I/O resource n, then once the system I/O resource m has written the multi-bit message into the AMPIC DRAM stack or array, the invention now provides a mechanism for informing system I/O resource n of both the existence of such a message and the message location within the AMPIC DRAM array. In addition, upon the system I/O resource n being informed of the existence of the message and its location in the array, in accordance with the present invention, a technique is provided for allowing the system I/O resource n to extract the message from the array. While the message data is thus being distributed across the entire AMPIC DRAM array, moreover, with each element of the array holding only a portion of the data, the complete signaling information must be sent to each individual element of the AMPIC DRAM array.

The invention, in addition, provides the further improvement of a partitioning technique for allowing both several simultaneous small size transfers or single very wide transfers, using the wide system internal data bus more efficiently to accommodate for both small and large units of data transfer.

OBJECTS OF INVENTION

A primary object of the present invention, accordingly, is to provide a new and improved apparatus for and method of architecturally enhancing the performance of multi-port internally cached DRAMs and the like by providing a novel mechanism and technique for permitting system I/O resources to send message data to one another, informing both as to the existence of such a message and the message location, and then to enable extraction of the message.

A further object is to provide such an improved system wherein, through a novel partitioning technique, the wide system internal data bus is more efficiently used to accommodate for both small and large units of internal data transfer, allowing also several simultaneous small message transfers or single very wide transfers.

Other and further objects will be explained hereinafter and are more particularly delineated in the appended claims.

SUMMARY OF INVENTION

In summary, from one of its broader aspects, the invention embraces in a multi-port internally cached array of AMPIC DRAM units in which a plurality of system I/O resources interface along common internal data buses connected to corresponding DRAM cores in each unit of the array, and wherein data from a CPU or similar source is also transferred with each unit along the buses during data transfer cycles, the method of improving performance, that comprises, concurrently with the data transfer, enabling the system I/O resources to send multi-bit messages to one another by sending the message from one system I/O resource to all AMPIC DRAM units of the array during said data transfer cycles, and concurrently with bit information on message address location in the DRAM.

Preferred and best mode designs, apparatus, techniques, and alternate structures are hereinafter explained in detail.

BRIEF DESCRIPTION OF DRAWINGS

The invention will now be described in connection with the accompanying drawings in which.

DESCRIPTION OF PREFERRED EMBODIMENTS(S) OF INVENTION

Figure 1:
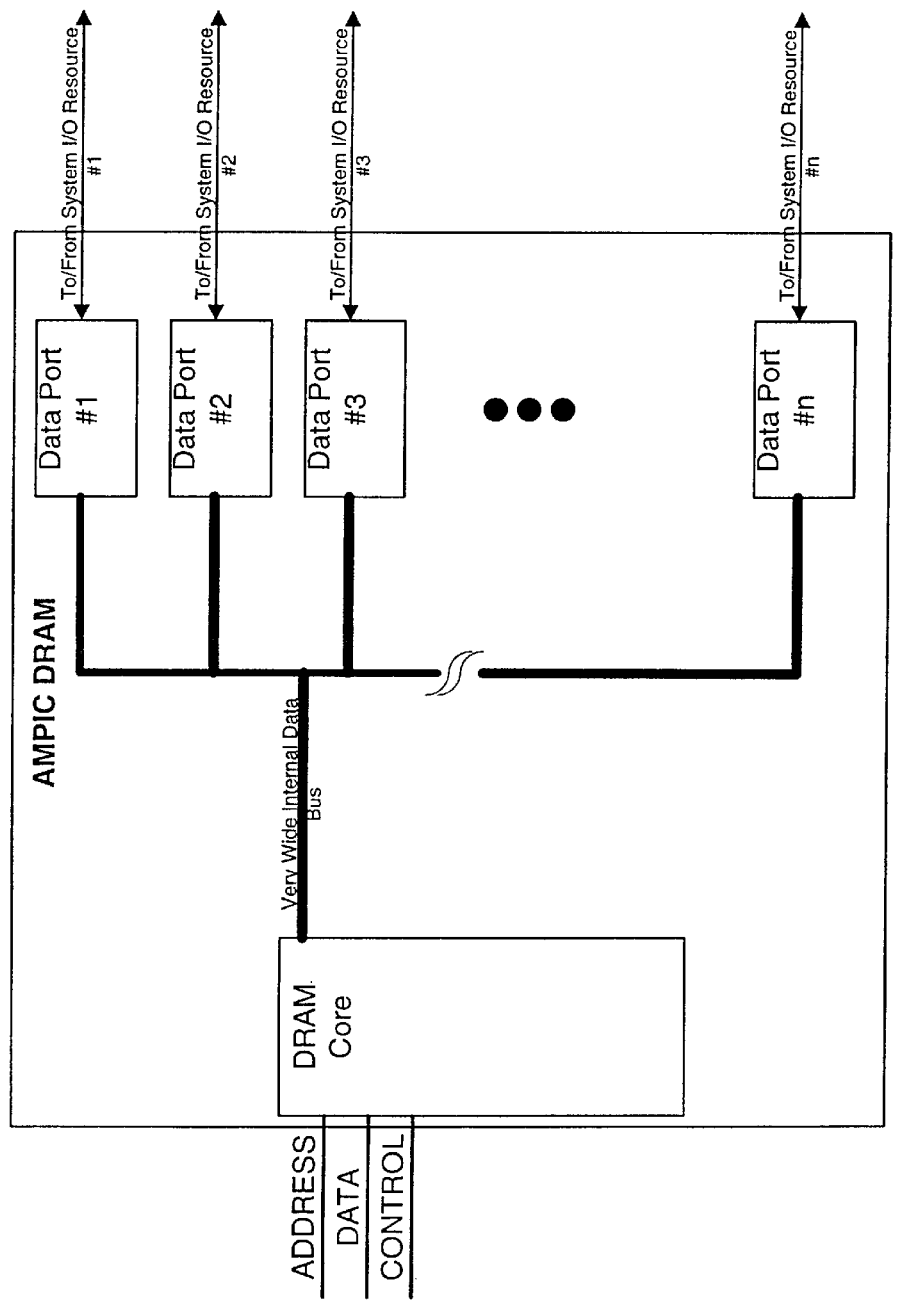
FIG. 1 is an illustrative block diagram of the internal architecture of the AMPIC DRAM of said copending application, the operation of which is enhanced by the present invention.
Figure 2:
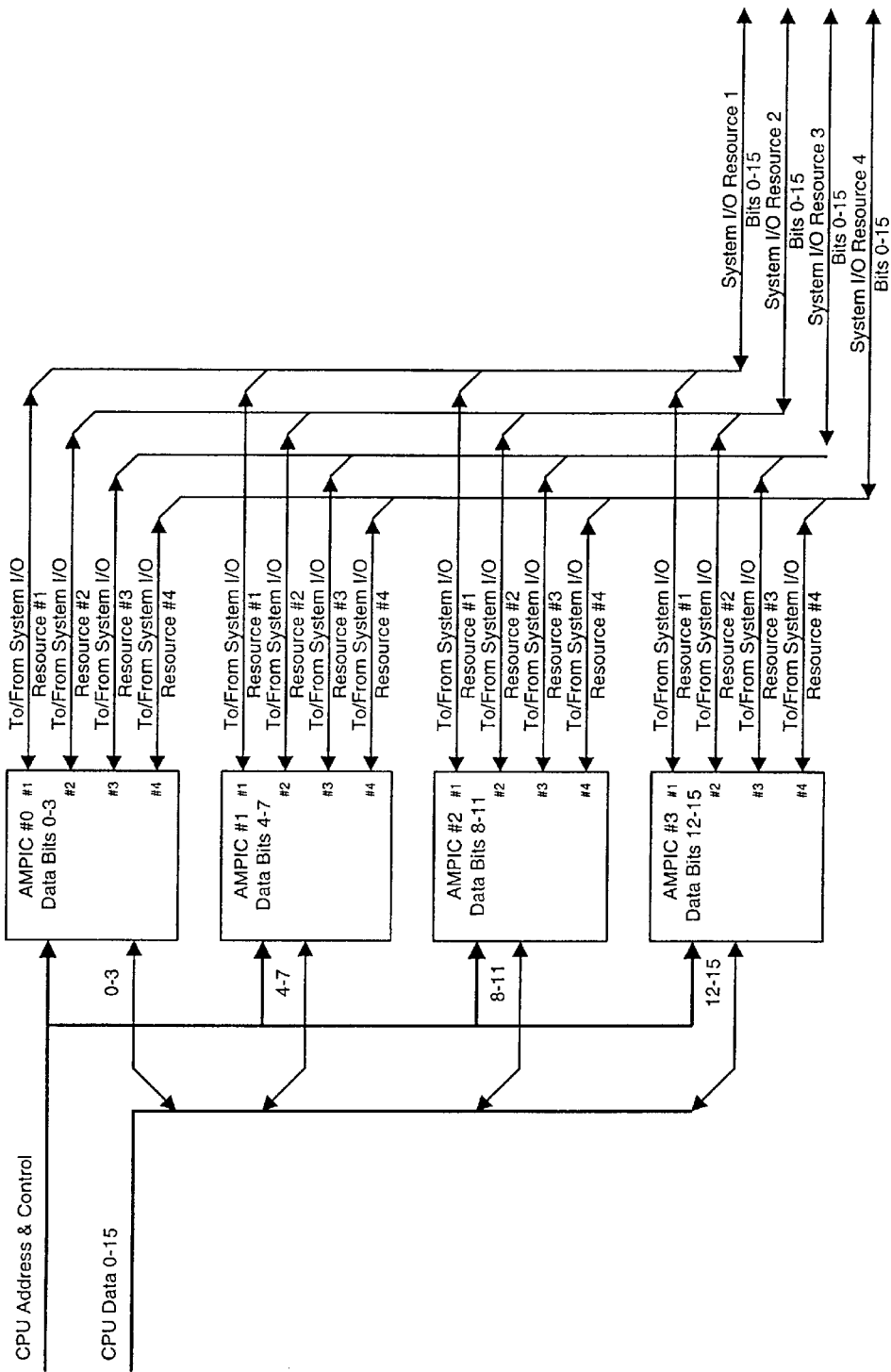
FIG. 2 is a block diagram of an illustrative system architecture based on the AMPIC DRAM of FIG. 1.

As previously noted, the basic structure provided by the AMPIC DRAM device of said copending application is illustrated in FIG. 1, providing a very high bandwidth connection between system I/O resources #1-#n via corresponding data ports through the DRAM memory array located within the AMPIC DRAM device. The flexibility of such an AMPIC DRAM device is further enhanced, as also earlier noted, by the ability to 'stack' multiple AMPIC DRAM devices, as illustrated in the example of FIG. 2. In FIG. 2, a system consisting of four AMPIC DRAM devices is illustrated, AMPIC #0–#3, the actual number of AMPIC DRAM devices in a system being limited only by the technology constraints. When such stacks or arrays of AMPIC DRAM devices are created, the total DRAM array size available to the system I/O resources is equal to the DRAM array size of each AMPIC DRAM device multiplied by the number of devices in the stack. For example, if each AMPIC DRAM illustrated in FIG. 2 is assumed to contain 64M bits of DRAM, then the AMPIC DRAM stack #0–#3 illustrated will provide a 256M bit DRAM array to the system I/O resources #1–#4.

While such an architecture does provide a very large amount of bandwidth for each system I/O resource to access the DRAM, the system does not enable one system I/O resource to send data to another system I/O resource, as earlier pointed out. For example, if system I/O resource m has a 32K bit message it needs to send to system I/O resource n, then once system I/O resource m has written the message into the AMPIC DRAM array #0–#3, then a new mechanism must be provided as by the present invention to inform system I/O resource n of both the existence of a message, and of the message location within the AMPIC DRAM array. Once system I/O resource n has been informed of the message existence and of the message location in the AMPIC DRAM array, furthermore, an additional novel mechanism must be provided, again in accordance with the present invention, to allow system I/O resource n to extract the message from the AMPIC DRAM array. It is important to note, as earlier stated, that while the message data is distributed across the entire AMPIC DRAM array, with each element of the array holding only a portion of the data, the complete signaling information must be sent to each individual element of the AMPIC DRAM array.

Assuming the existence of a novel mechanism of the type alluded to above and later described as provided by the present invention, by which system I/O resources may send messages to each other through the AMPIC DRAM array, in the illustrative example of system I/O resource m transferring a 32K bit message to system I/O resource n, the 1 Kbyte internal data bus would allow the message to be transferred between the two system I/O resources in only 2 AMPIC DRAM transfer cycles. For the purposes of illustration, if an AMPIC DRAM transfer cycle is assumed to be 50 nanoseconds (nS) in duration, the total bandwidth available within the AMPIC DRAM is seen to be 32K bits per 50 nS or 655 gigabits per second. This very wide bus, however, is less well suited to transferring small messages between system I/O resources. An application where small messages will need to be transferred between system I/O resources, for example, is in ATM networking. In ATM, data is transferred in units of only 424 bits. If system I/O resources m and n are both ATM network devices, then system I/O resource m may have a 424 bit message to send to system I/O resource n. In this case, the 32K bit wide internal bus will be used to complete the transfer in only 2 AMPIC DRAM transfer cycles, but a very large amount of the internal bus is wasted in this transfer. Even though the message occupies only 424 bits of the 32K bit wide bus, all other system I/O resources will be unable to use the data bus during the time that system I/O resources m and n are completing their transfer. If an AMPIC DRAM transfer cycle is again assumed to be 50 nS for the purposes of this example, the total bandwidth used in this example is only 424 bits per 50 nS or about 8.5 gigabits per second. Note that only about 1.3% of the bandwidth available within the AMPIC DRAM is actually utilized in this example.

The present invention discloses an approach whereby the very wide internal data bus will be more efficiently utilized in such situations, further enhancing the usefulness of the AMPIC DRAM architecture by making it equally well suited for small and large units of data transfer.

It is now in order to discuss architectures by which the present invention achieves these improvements. Specifically, when system I/O resource m has a message to be written into the AMPIC DRAM, the system I/O resource must be able to inform all of the AMPIC DRAMs in the system as to the DRAM address at which to place the message. The present invention provides the architecture and mechanism disclosed in FIG. 3 for achieving this result. In the system illustrated in FIG. 3, the four AMPIC DRAMs of FIG. 2 are shown as CHIP 0–3, each with a 1 bit wide serial interface to the system I/O resource. In the example of FIG. 2, as disclosed in said co-pending application, on the first cycle of the data transfer, CHIP 0 gets data bit 0, CHIP 1 gets data bit 8, CHIP 2 gets data bit 16, and CHIP 3 gets data bit 24. On the next clock cycle, all the data bits are incremented. This process continues until the entire message has been sent to the AMPIC DRAM.

Figure 3:
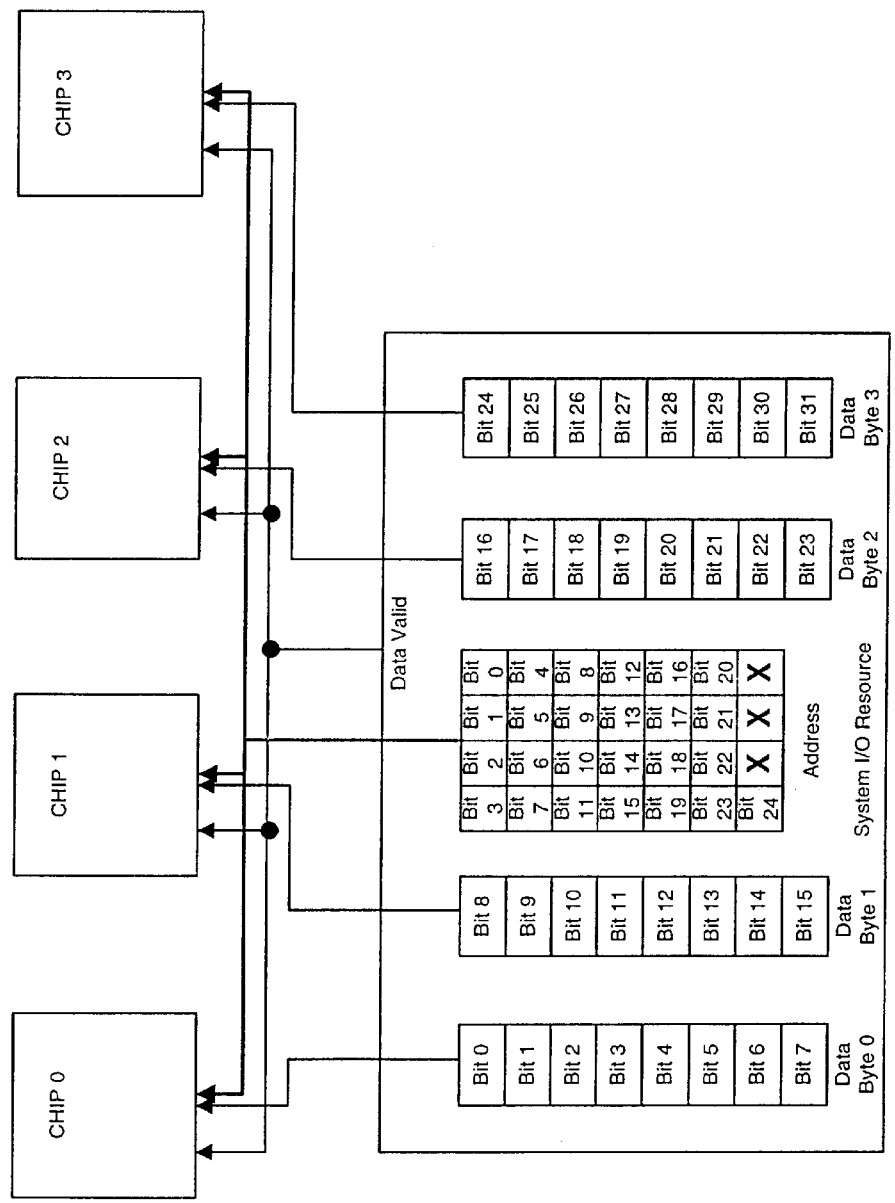
FIG. 3 illustrates the novel apparatus and method by which address and data are distributed to the AMPIC DRAM devices by the system I/O resources in accordance with the present invention.

In accordance with the present invention, as illustrated in FIG. 3, concurrent with this data transfer, the system I/O resource will also be required to transfer the address at which to place the data in the DRAM. The width of the address register in the system I/O resource will be determined by the size of the DRAM array in the AMPIC DRAM and the number of AMPIC DRAM devices in the system.

From the before-mentioned example, a system with four AMPIC DRAM devices, each of which contains 64M bits of DRAM, will provide a 256M bit AMPIC DRAM array, requiring 25 address bits. Due to the large number of address bits required by large memory arrays, however, it may be necessary to define the address bus between the system I/O resource and the AMPIC DRAM to be narrower than the total address size, and use several transfers to transmit the complete address into the AMPIC DRAM. For example, if the address bus were defined as 4 bits wide, then 7 cycles could be used to transfer the complete 25 bit address into the AMPIC DRAM. This address transfer would take place concurrently with the data transfer from the system I/O resource, as illustrated in FIG. 3. On the first cycle of the transfer, bits 0 through 3 of the "Address" are transferred. On the second cycle, bits 4 through 7 of the Address are transferred, and so on until the entire address has been transferred to all the AMPIC DRAMs. It is important to note that, unlike in the data transfer, where each AMPIC DRAM in the system receives a different portion of the data, each AMPIC DRAM in the system of FIG. 3 will receive an identical copy of the complete DRAM address, thus causing each AMPIC DRAM to write the message transmitted by the system I/O resource into the same location in the internal DRAM array.

Figure 3A:
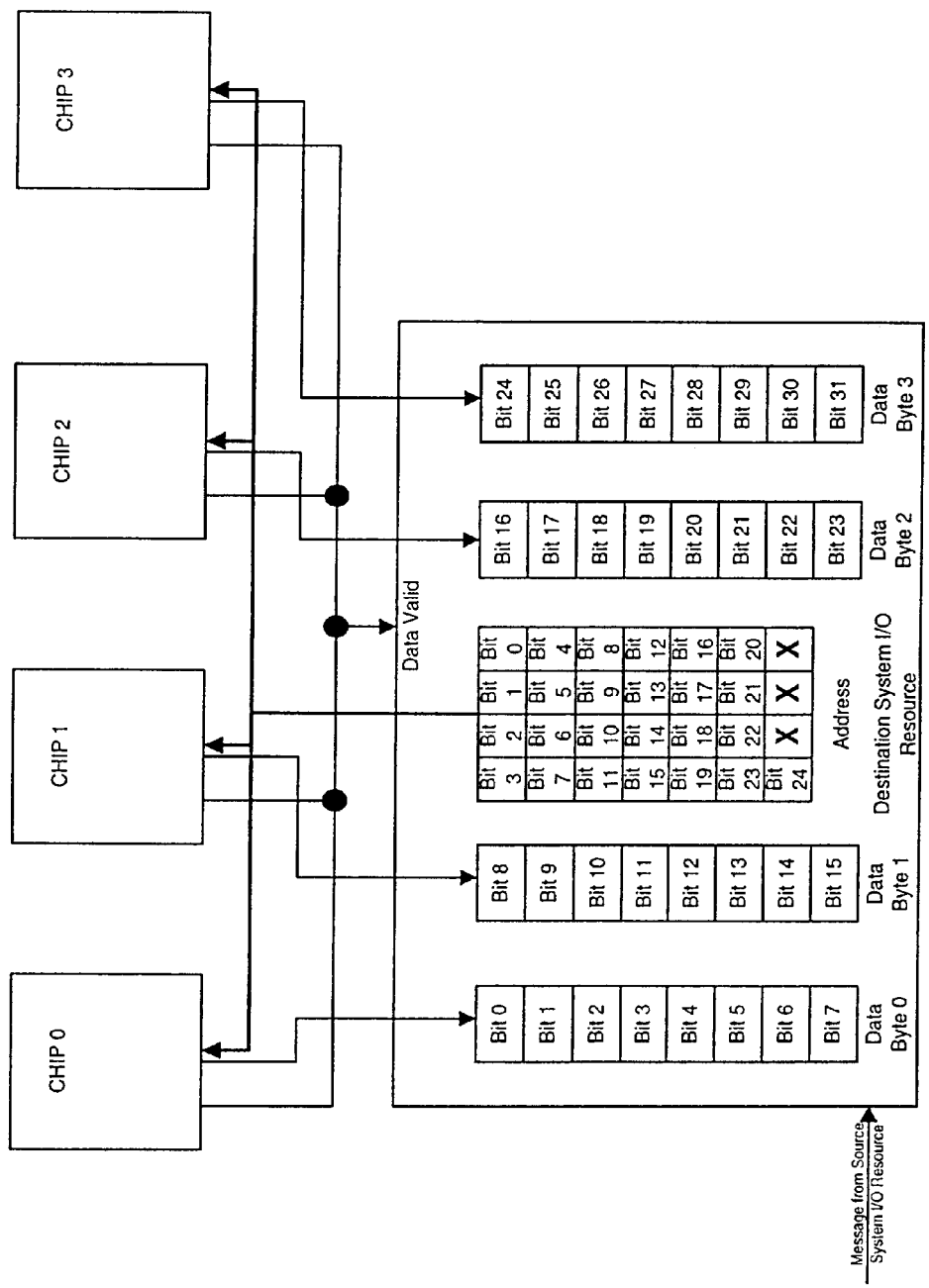
FIG. 3a illustrates the novel apparatus and method by which data is distributed from the AMPIC DRAM devices to the system I/O resources in accordance with the present invention.

In order for the message to reach its destination system I/O resource, a similar addressing process must occur at the destination side, as shown in FIG. 3*a*. Once system I/O resource m has written the message into the AMPIC DRAM array, the address at which the message was written and the total size of the message must be forwarded to the destination system I/O resource. The destination system I/O resource, upon receiving the address of the message, will drive that address into each of the AMPIC DRAM devices. Each AMPIC DRAM device will proceed to read its portion of the message data out of its DRAM array from the given address and forward the message on to the destination system I/O resource. In the preferred embodiment of the invention, the size of the message is also stored in the DRAM array when the message is written into the DRAM array. As the AMPIC DRAM device receives the message, it counts the number of bits in the message; as illustrated in FIG. 3, a Data Valid signal is provided on all the AMPIC DRAM data receive ports. The source system I/O resource holds Data Valid asserted for as long as the message data is being transmitted to the AMPIC DRAM, and the AMPIC DRAM uses this assertion of the Data Valid signal to determine the length of the message. When the data is written to the DRAM array, this bit count is stored along with the message itself. When the message is read out of the DRAM array, the corresponding bit count is read out along with the data. The AMPIC DRAM then uses this bit count to determine the length of the message to be transmitted. The AMPIC DRAM indicates the size of the message to the destination system I/O resource by asserting the Data Valid signal for as long as is indicated by the message bit count.

Figure 4:
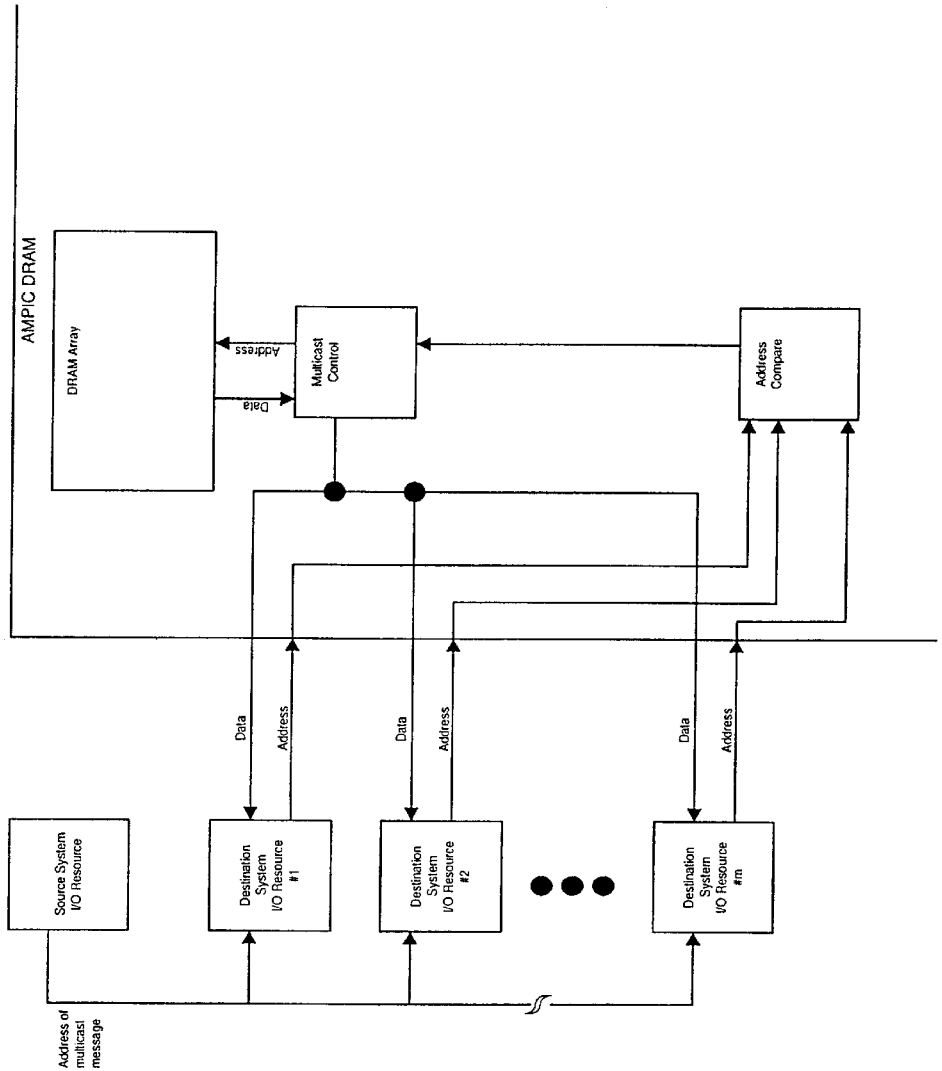
FIG. 4 illustrates the novel apparatus and method by which the AMPIC DRAM may efficiently distribute a multicast message to each of the message destination ports.

The presence of each message DRAM address within each AMPIC DRAM device also provides an efficient solution for the case of one system I/O resource having a single message which must be sent to several other system I/O resources, which is illustrated in FIG. 4. A message of this type is defined as a multicast message. In the case of a multicast message, the source system I/O resource writes the message into the AMPIC DRAM in the same way a standard, or unicast, message is written. The address of this multicast message within the DRAM array is then forwarded to all of the system I/O resources which are required to receive the message. Each of the destination system I/O resources #1–#m then proceeds to drive the address of the multicast message into the AMPIC DRAM device. Given that the AMPIC DRAM device is provided with the address compare logic, illustrated in FIG. 4, which can compare DRAM addresses received from different system I/O resources, the multicast control portion of the AMPIC DRAM then recognizes that the same DRAM address was received from each of the multicast message system I/O resources, and only needs to execute a single DRAM read cycle. The DRAM data from that read cycle is then forwarded to all of the destination system I/O resources #1–#m at the same time by the multicast control logic illustrated in FIG. 4, thus eliminating the requirement of several DRAM reads for multicast messages.

In the preferred embodiment of the invention, the total number of address bits required to specify the DRAM location at which to write the message is further reduced by logically partitioning the DRAM into many equally sized sections. For example, in the case of a 256M bit AMPIC DRAM array spread across four AMPIC DRAM devices, the array may be divided, for example, into 2048 bit sections. In this case, the DRAM array would now consist of 128K sections; each AMPIC DRAM device would store 512 bits of each of the 128K sections. As a result, only 17 address bits would be required completely to specify the address to the AMPIC DRAM. Going back to the example of a 4 bit wide address bus, only 5 cycles would now be required to transfer the address from the system I/O resource into all of the AMPIC DRAM devices. In so partitioning the memory, it may be desirable to keep the size of the sections small, so as to minimize wasted memory space. In the above example of 2048 bit sections, if, for example, system I/O resource m has a 512 bit message to write into the AMPIC DRAM, then the message will only partially fill a DRAM section, resulting in wasted memory space.

Figure 5:
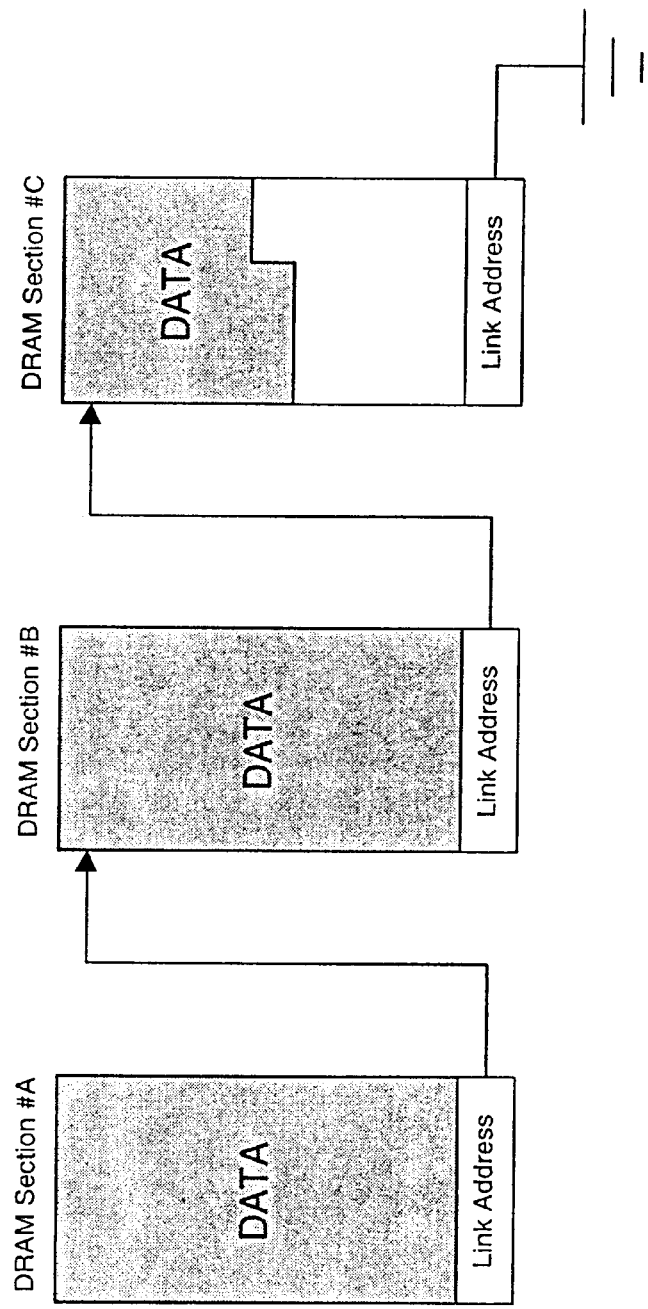
FIG. 5 is a diagram that illustrates the "linking" together of a unit of data across several DRAM sections.

While maintaining small section sizes, however, the invention also provides a mechanism to handle cases where system I/O resource m may have a message to be written into the AMPIC DRAM which is larger than a section. The solution to this problem in the preferred embodiment of the invention is illustrated in FIG. 5. Each DRAM section #A–#C reserves some number of bits to contain what is referred to as a Link Address. When system I/O resource m has a message to write into the AMPIC DRAM which is larger than the currently defined section size, the system I/O resource will first need to divide the message into several pieces, the size of each being less than or equal to the currently defined section size. The first piece of the message will be placed into the first DRAM section, and the Link Address of that section will be set to point to the next DRAM section, into which the second piece of the message will be placed, and so on, until the entire message has been written into the AMPIC DRAM array. The result for an example in which a message occupies 3 DRAM sections is illustrated in FIG. 5. For purposes of illustration, a message size of 5120 bits will be assumed, and the section size will be assumed to be 2048 bits, as explained above. In this case, bits 1–2048 of the message will reside in DRAM Section #A, bits 2049–4096 will reside in DRAM Section #B, and bits 4097–5120 will reside in DRAM Section #C, resulting in a partially filled DRAM Section, as illustrated in FIG. 5.

Because the Link Address is stored in the AMPIC DRAM array along with the message data, the AMPIC DRAM reassembles the complete message when sending the message to the destination system I/O resource. When a section is read out of the AMPIC DRAM array, logic in the AMPIC DRAM examines the section Link Address portion to determine if this DRAM section is one part of a larger message. If the Link Address points to another section of the DRAM, then the AMPIC DRAM reads that section out of the DRAM array for forwarding to the destination port. This process continues until the AMPIC DRAM finds a DRAM section the Link Address of which does not point to another section, at which point the entire message has been reassembled. This message reassembly occurs without any intervention on the part of the destination system I/O resource; it is handled entirely by logic within the AMPIC DRAM.

Figure 6:
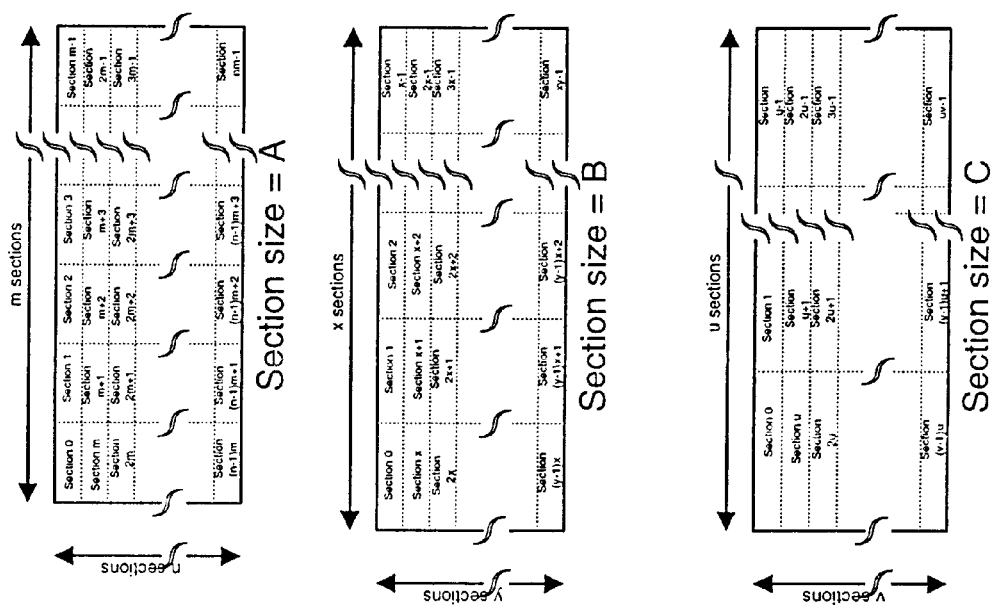
FIG. 6 illustrates the dividing of the DRAM array into several equally sized sections, with several section sizes.
Figure 7:
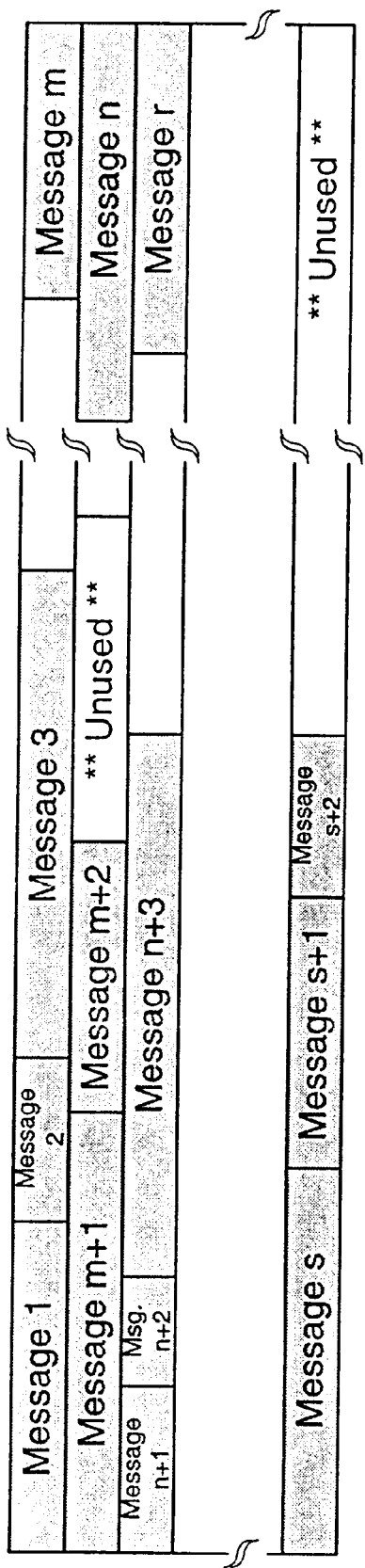
FIG. 7 illustrates the dividing of the DRAM array into many sections each of different size.

In an alternate embodiment of the invention, the section size is not fixed within the AMPIC, but is instead programmable to a range of different values as illustrated in FIG. 6. For example, in a system where primarily small messages are passed between system I/O resources, the section size may be set to, say, 256 bits. In a system where primarily large messages are passed between system I/O resources, the section size may be set to, for example, 2048 bits. A range of such sizes would be provided by the AMPIC DRAM device, in order to maximize the use of the DRAM array and minimize wasted memory space caused by messages which are smaller than the section size. In FIG. 6, an example of three different section sizes, A, B, and C, and the resulting structure of the DRAM array are presented. In an additional alternate embodiment, wasted DRAM space may be totally eliminated by not dividing the DRAM array into sections at all, as illustrated in FIG. 7. In this embodiment, messages are always placed into the DRAM array back to back, regardless of their size. While increasing the number of address bits required to keep track of DRAM addresses, this embodiment has the advantage of using the memory most efficiently, FIG. 7 illustrating how different-sized messages may be distributed throughout the DRAM array.

Figure 8:
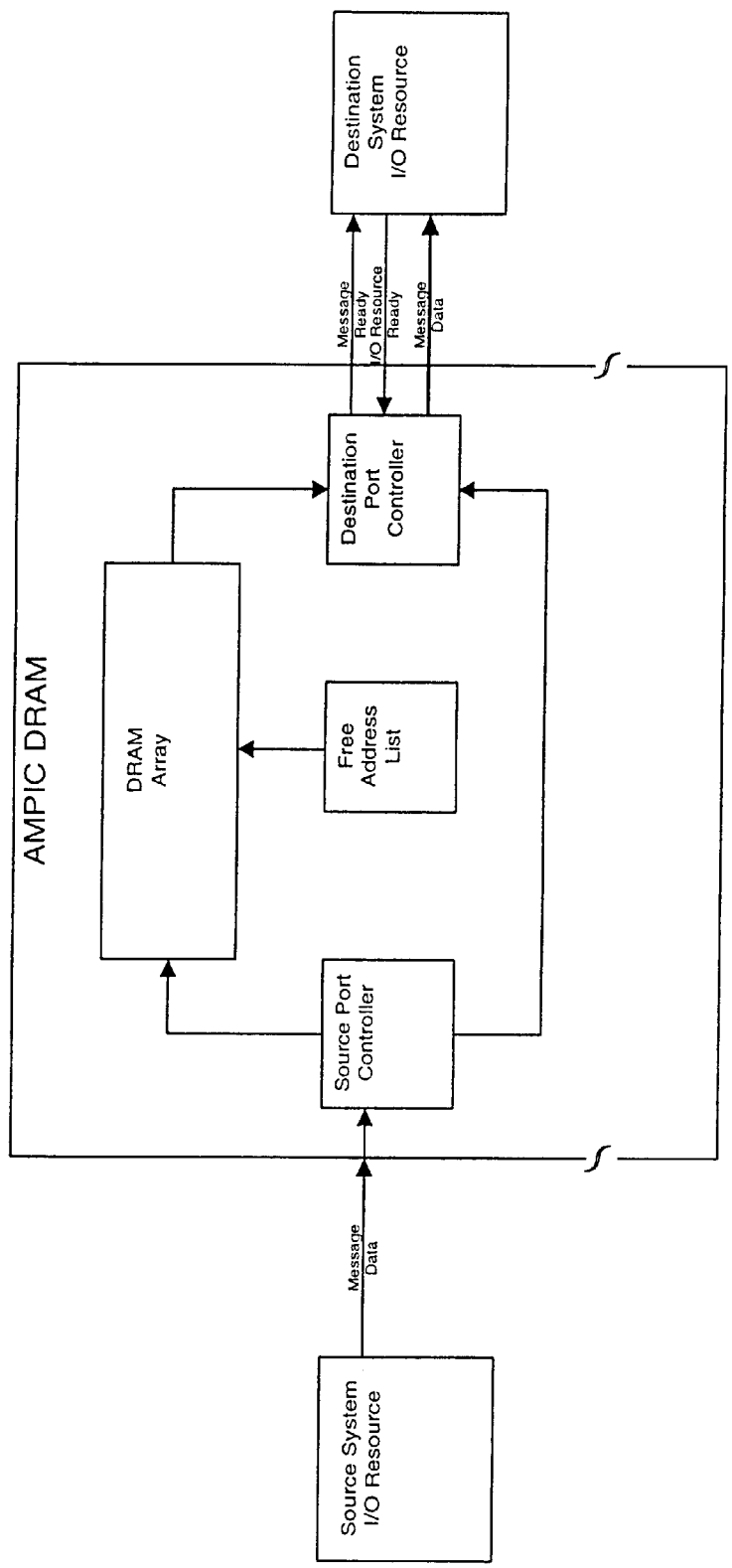
FIG. 8 is a diagram illustrating the apparatus and method by which the AMPIC DRAM accomplishes all of the passing of messages from source system I/O resource to destination system I/O resource internal to the AMPIC DRAM.

In the preferred form of the invention, all the passing of addresses between source system I/O resources and destination I/O resources takes place in logic external to the AMPIC DRAM. In an alternate embodiment, this function is handled by the AMPIC DRAM itself, as illustrated in FIG. 8. Here, all addressing and passing of addresses from source system I/O resource to destination system resources takes place inside the AMPIC DRAM itself. In this embodiment, the system I/O resources need no knowledge of the DRAM address at which messages are located within the AMPIC DRAM array. For example, if the source system I/O resource had a message to send to the destination system resource, then the source system I/O resource would send the message data into the AMPIC DRAMs, without also needing to drive in an address. It should be noted that FIG. 8 illustrates only a single AMPIC DRAM device; the discussion, however, being equally applicable to a system consisting of multiple AMPIC DRAMs, as previously discussed. Upon receiving the message data, the AMPIC DRAM chooses a free address in its DRAM array from the free address list and writes the message to that location. That address is then forwarded to the AMPIC DRAM port to which the destination system I/O resource is connected. The AMPIC DRAM then informs the destination system I/O resource of the existence of a message for it within the AMPIC DRAM using the Message Ready signal illustrated in FIG. 8. At some point later, the destination system I/O resource signals that it is ready to accept the message via the Resource Ready signal of FIG. 8, at which point each AMPIC DRAM device retrieves its portion of the message data from its DRAM array and forwards the data on to the destination system I/O resource. In this way, the system I/O resources are made completely independent of the internal structure of the AMPIC DRAM devices; the AMPIC DRAM array functions as a store and forward m X n cross-connect array. In this embodiment, in addition to keeping track of the locations of messages in the DRAM array, the AMPIC DRAM must also keep track of the amount of free space remaining in the DRAM array. As the DRAM array begins to fill up, the AMPIC DRAM must be able to signal the system I/O resources not to send any messages for some period of time, until the DRAM array has started to empty out. The Free Address List, as illustrated in FIG. 8, is used for this purpose.

Figure 9:
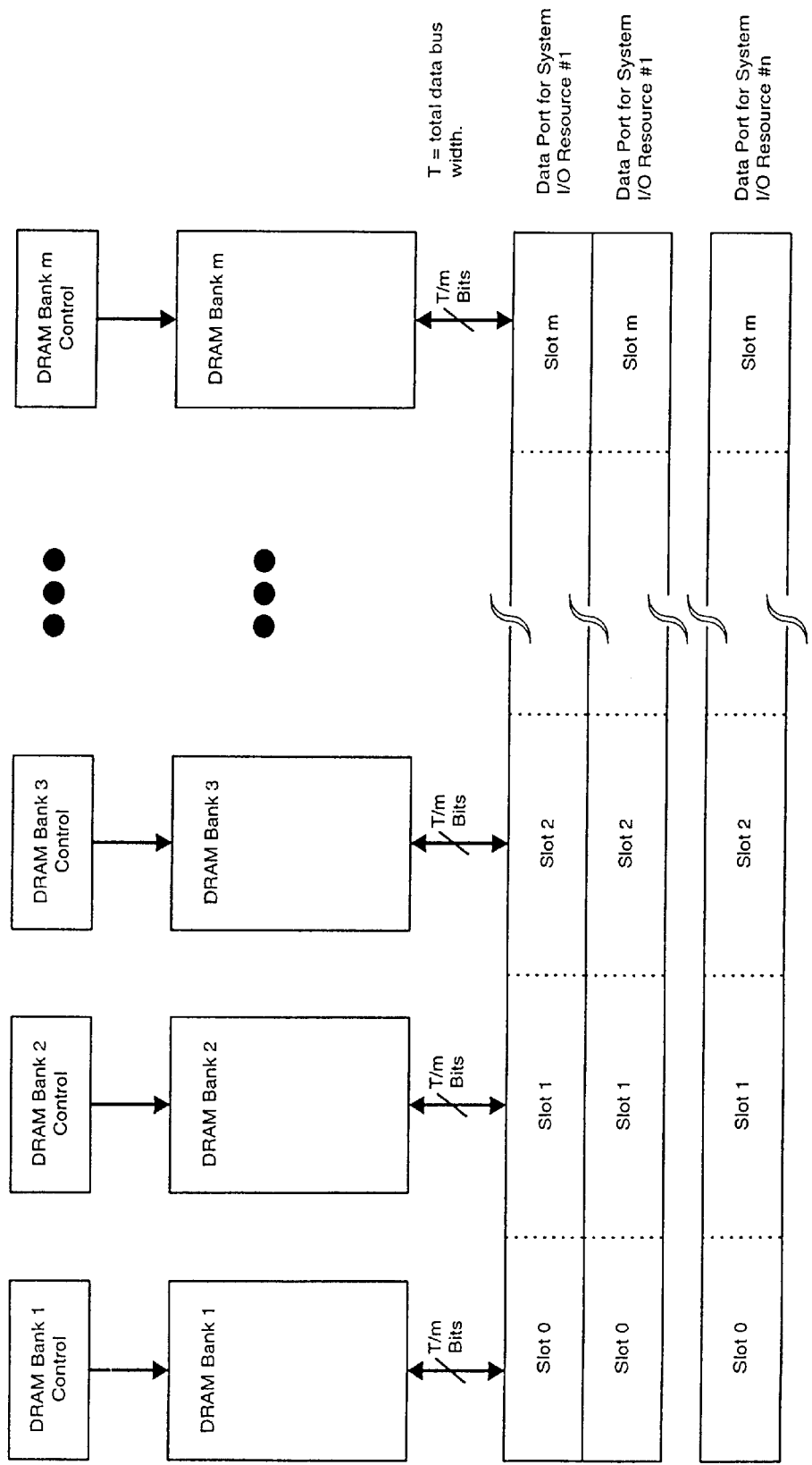
FIG. 9 is a block diagram of the preferred architecture of the AMPIC DRAM internal system bus, illustrating the novel partitioning techniques of the invention to allow both several simultaneous small transfers, or single very wide transfers.

It is now in order to describe a preferred mechanism by which data is transferred within the AMPIC DRAM devices as illustrated in FIG. 9. The DRAM array of an AMPIC DRAM device is shown physically divided or partitioned into several independently controlled banks; the actual number of DRAM banks implemented (DRAM Banks 1–m) will depend only on the technology used to implement the AMPIC DRAM. In order to simplify the discussion, a system consisting of only a single AMPIC DRAM device will accordingly be discussed here, the discussion being equally applicable to systems consisting of multiple AMPIC DRAM devices. In the latter case, the DRAM array in each AMPIC DRAM device will be partitioned identically.

Preferably, the number of DRAM banks will be greater than or equal to the number of system I/O resources which can be connected to the AMPIC DRAM. The very wide internal data bus is shown in FIG. 9 evenly divided between each of the DRAM banks. For example, in an AMPIC DRAM implementation with 64 DRAM banks and a 32K bit wide data bus, the data bus for each DRAM bank would be 512 bits wide; the sixty-four 512 bit wide buses would combine to form the complete 32K bit wide data bus. As disclosed in said copending application and in FIG. 1, each system I/O resource is connected to a data port within the AMPIC DRAM, which in turn connects to the internal very wide data bus. In the embodiment illustrated in FIG. 9, each of these data ports is divided into a number of slots (0–m); the number of slots in each data port being equal to the number of DRAM banks. In the beforementioned example, each data port will be 32K bits wide, and will be divided into 64 sections of 512 bits each. Each slot corresponds to a single bank of the DRAM array. As data arrives from the system I/O resource, the data is streamed into the appropriate slot of that system I/O resource data port; the appropriate slot being determined by the DRAM address to which the data is to be written, which will in turn determine into which DRAM bank the data is written. It should be recalled that in the preferred embodiment of the invention, this address is provided by the system I/O resource concurrent with the message data. If the incoming message is, for example, 32K bits wide, then the entire message may be streamed into all 64 slots of the data port, and then written into the DRAM array in a single AMPIC DRAM write cycle. If an illustrative value of 50 nS is once again assumed for the duration of an AMPIC DRAM transfer cycle, the resultant internal AMPIC DRAM bandwidth is seen to be 32K bits per 50 nS or 655 gigabits per second.

Alternately, returning to the previously mentioned example of ATM networking, if the incoming message is very short, for example, 424 bits, then only one slot of the system I/O resource data port need be used. In this case, if several other system I/O resources have filled different slots of their data ports with similarly sized messages, all of those messages may be transferred to the DRAM at the same time, allowing for more efficient utilization of the very wide data bus. Alternately, a single system resource may be allowed to accumulate multiple short messages, filling several slots of its data port before writing the message data into the DRAM array. It should be noted that a single system I/O resource may only accumulate several short messages in its data port if each of the messages is destined for a different DRAM bank, as indicated by the message addresses. In either case, in the current example of 64 DRAM banks, up to 64 messages may be transferred within the AMPIC DRAM simultaneously, whether from the same system I/O resource, or from many different system I/O resources. Using the illustrative figure of 50 nS for the duration of an AMPIC DRAM transfer cycle, the utilized bandwidth for ATM networking is therefore calculated to be (64*424) bits per 50 nS or 542 gigabits per second, or almost 83% of the total available bandwidth. This total bandwidth utilization will increase as the number of DRAM banks provided in the AMPIC DRAM device is increased. The DRAM and buffering structure herein disclosed, therefore, provides a balance between support of small numbers of very wide data transfers, and larger numbers of small data transfers, by allowing several small data transfers from different system I/O resources to occur simultaneously.

Figure 10:
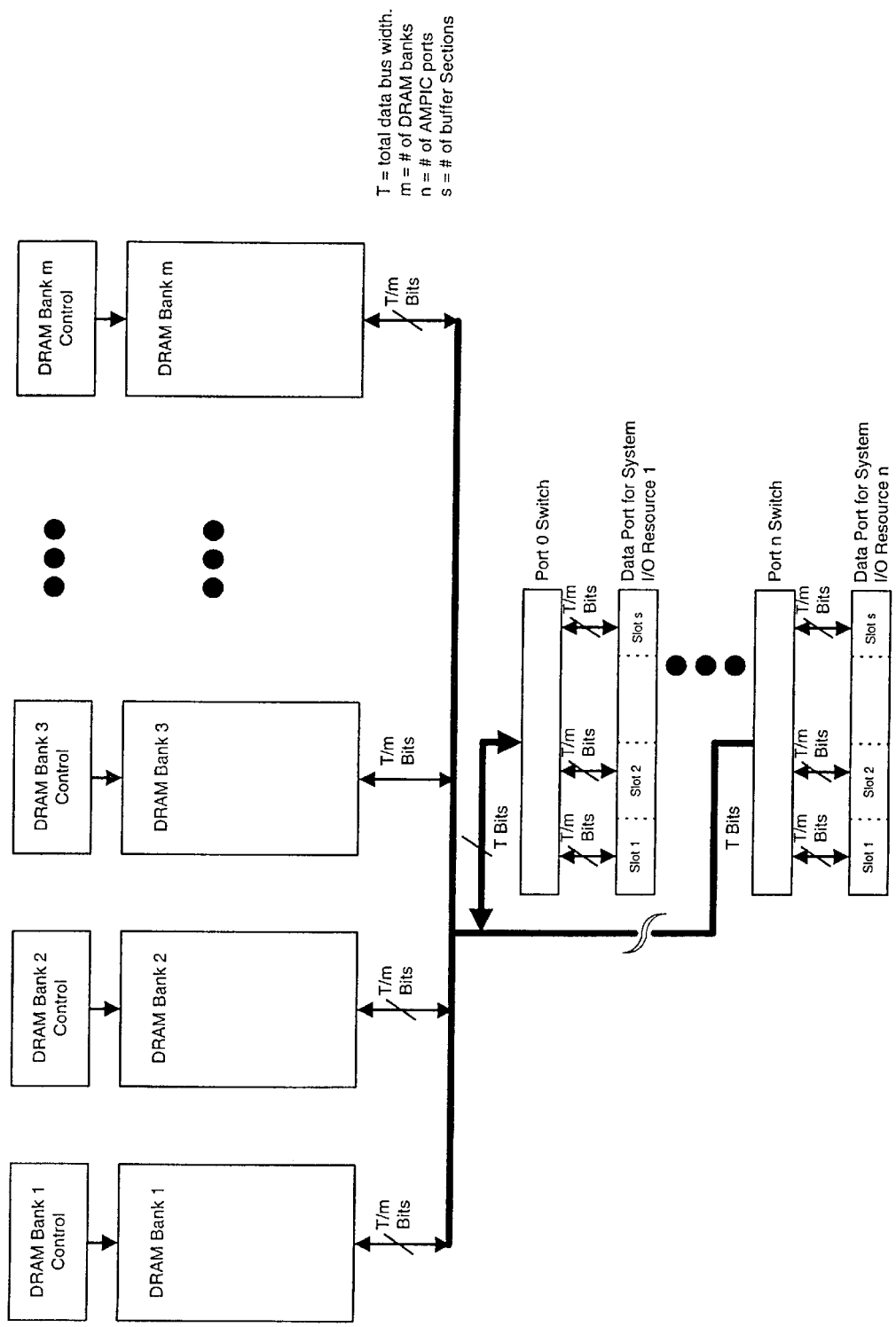
FIG. 10 shows an alternate embodiment of the AMPIC DRAM internal system bus, with a crossbar switch located between each AMPIC DRAM port buffer and the DRAM array for achieving results similar to those attained with the system of FIG. 9.

The previously described embodiment of this invention, however, has a limitation when a system I/O resource sends two consecutive messages into the AMPIC DRAM both of which are destined for the same DRAM bank. In this special case, since both messages must use the same slot of the data port, the second message must wait until after the first message has been written into the DRAM array before being written into the data port. An alternate embodiment of the invention for alleviating this problem is illustrated in FIG. 10. In this embodiment, an mXn crossbar switch is placed between each system resource data port (1–n) and the DRAM array (banks 1–m). In this case, the DRAM array consists of m banks and the buffer consists of s slots. The crossbar switch enables any section of the buffer to be driven to any one of the DRAM banks, therefore making the buffer independent of the DRAM address used; rather than controlling into which buffer section the data must be written, the DRAM address will control the functioning of the switch. In this example, if system I/O resource 1 has written 424 bits into data port slot 0 destined for DRAM bank 1 and system I/O resource n has also written 424 bits into slot 1 of its data port destined for DRAM bank m, then both messages may be written into the DRAM simultaneously. Logic in the AMPIC DRAM will need to control each port switch appropriately to switch the correct data port slot(s) to the correct DRAM bank(s) for each transfer. It is important to note that this switch will also need to operate bidirectionally; that is, for reads of the DRAM where data is to be transmitted from the AMPIC DRAM to a system I/O resource, the switch must be able to move data from the correct DRAM banks into the proper data port slots. While not altering the total bandwidth utilization provided by the preferred embodiment of this invention, by providing address-independence in the use of buffer sections, the crossbar switch in this alternate embodiment allows for much more flexible use of the entire data port. In the before-mentioned example of a system I/O resource driving two consecutive messages into the AMPIC DRAM both destined for the same DRAM bank for example, the second message is now written into the next available slot of the data port, regardless of its eventual destination DRAM bank.

The mXn crossbar switch is used to forward the message to the appropriate DRAM bank when the time comes to write the message into the DRAM.

Further modifications will also occur to those skilled in this art, and such are considered to fall within the spirit and scope of the invention as defined in the appended claims.

What is claimed is:

1. In a multi-port internally cached array of AMPIC DRAM units in which a plurality of system I/O resources interface along common internal data buses connected to corresponding DRAM cores in each unit of the array, and wherein data from a CPU or similar source may also be transferred with each unit along the buses during data transfer cycles, the method of improving performance, that comprises, concurrently with the data transfer, enabling the system I/O resources to send multi-bit messages to one another by sending the message from one system I/O resource, intended for a system destination I/O resource, to the AMPIC DRAM units which, upon receiving the message data, choose a free address location in the DRAM array and write the message to that location, so informing the system destination I/O resource with a message ready signal; and, when the system destination I/O resource is ready to accept the message, retrieving its portion of the message data from each DRAM of the array and forwarding the data on to the destination I/O resources, all independently of the internal structure of the AMPIC DRAM units, and with the array functioning as a store and forward cross-connect array.

2. The method claimed in claim 1 wherein each AMPIC DRAM unit receives a different portion of the data during said data transfer, but each AMPIC DRAM unit receives the same DRAM message address location, enabling each AMPIC DRAM to write the message transmitted by a system I/O resource into the same location in the internal DRAM array.

3. The method claimed in claim 2 wherein, upon message receipt at destination system I/O resources, the message is read out.

4. The method claimed in claim 1 wherein, following the writing of the message sent by a system I/O resource into the AMPIC DRAM array, the step is performed of providing the destination system I/O resource for which the message is intended with information of both the existence of a message and the message address location within the AMPIC DRAM array.

5. The method claimed in claim 4 wherein the destination I/O resource for which the message is intended, upon being so informed, extracts the message from the AMPIC DRAM array.

6. The method claimed in claim 5 wherein the message data is distributed across the entire AMPIC DRAM array, with each element of the array holding a portion of the data, and the complete signaling information of the message is sent to each individual element of the AMPIC DRAM array.

7. The method claimed in claim 3 wherein the DRAM array logically partitioned into a plurality of sections.

8. The method claimed in claim 7 wherein the sections are of equal sizes.

9. The method claimed in claim 7 wherein link address bits are included in the message location information linking parts of messages larger than said sections.

10. The method claimed in claim 1 wherein the AMPIC DRAM array is divided into several independently controlled banks greater than or equal to the number of system I/O resources connected to the AMPIC DRAM, and each internal data bus is divided evenly between each of the DRAM banks.

11. The method claimed in claim 10 wherein crossbar switching is interposed between each system I/O resource data port and the DRAM array for bidirectionally switching the correct data port to the correct DRAM bank for each transfer.

12. The method claimed in claim 4 wherein, the size of the message is also forwarded to the destination system I/O resource with the message address location.

13. The method claimed in claim 12 wherein the size of the message is stored in the DRAM array when the message is written therein, and the size of the message is indicated to the destination system I/O resource by asserting a Data Valid signal during by the message bit count.

14. The method claimed in claim 4 wherein the destination system I/O resource, upon receiving the address location of the message, drives the address location into each of the AMPIC DRAMs.

15. The method claimed in claim 5 wherein once the address location of the message has been driven into each of the AMPIC DRAMs, its portion of the message data out of each AMPIC DRAM of the array, and the message forwarded on to the destination I/O resource.

16. The method claimed in claim 14 wherein the message is sent to several destination system I/O resources as a multicast message, and, upon recognizing that the same DRAM address being received from each of the multicast message system I/O resources, a single DRAM read cycle is executed.

17. The method claimed claim 9 wherein in the read out of the messages from the successive sections of the AMPIC DRAM array is completed when the link address in one section no longer point to another section, the entire message has been read out.

18. A method as claimed in claim 7 and in which the section size is programmed to a range of variable size values to accommodate for primarily relatively small and large messages, respectively.

19. A method as claimed in claim 3 and in which messages are stored in the DRAM array back-to-back irrespective of message size, with different-size messages accordingly distributed throughout the array.

20. A method as claimed in claim 3 and in which the passing of addresses between the system I/O resources is effected in logic external to the AMPIC DRAM.

21. In a multi-port internally cached array of AMPIC DRAM units in which a plurality of system I/O resources interface along common internal data buses connected to corresponding DRAM cores in each unit of the array, and wherein data from a processing source may also be transferred with each unit along the buses during data transfer cycles, the method of improving performance, that comprises, concurrently with the data transfer, enabling the system I/O resources to send multi-bit messages to one another by sending the message from one system I/O resource to all AMPIC DRAM units of the array during said data transfer cycles, and concurrently with bit information on message address location in the DRAM wherein the AMPIC DRAM array is divided into several independently controlled banks greater than or equal to the number of system I/O resources connected to the AMPIC DRAM, and each internal data bus is divided evenly between each of the DRAM banks, and wherein each system I/O resource is converted to a data port within the AMPIC DRAM, and the step is performed of dividing each port into a number of slots equal to the number of DRAM banks, and streaming data arriving from the system I/O resource into the appropriate slot of that system I/O resource data port as determined by the DRAM address to which the data is to be written, and in turn determining into which DRAM bank the data is written.

22. A method as claimed in claim 21 and in which relatively short messages are employed as in ATM networking, and the incoming message data from a system I/O resource is streamed into a slot of the system I/O resource data port; and wherein, if other system I/O resources have filled different slots of their corresponding data ports with similarly short messages, transferring all the messages to the DRAM array at the same time, thereby enabling efficient utilization of said data buses.

23. Apparatus for enhancing the performance of a multi-port internally cached (AMPIC) array of DRAM units in which a plurality of system I/O resources interface along common internal data buses connected to corresponding DRAM cores in each unit of the array, and wherein data from a processing source may also be transferred with each unit along the buses during data transfer cycles, said apparatus having, in combination, logic circuits for enabling the system I/O resources to send multi-bit messages to one another by sending the message from one system I/O resource to all AMPIC DRAM units of the array during said data transfer cycles, and concurrently with the information on message address location in the DRAM; each AMPIC DRAM unit receiving a different portion of the data during said transfer, and with each AMPIC DRAM unit connected to receive the same DRAM message address location and to write the message transmitted by a system I/O resource into the same location in the internal DRAM array, wherein destination system I/O resources are provided with means for enabling the message to be read out, and wherein the array is divided into several independently controlled DRAM banks in which each system I/O resource is connected to a data port within the AMPIC DRAM, and each port is divided into a number of slots equal to the number of DRAM banks, with data arriving from the system I/O resource streaming into the appropriate slot of that system I/O resource data port as determined by the DRAM address to which the data is to be written, and in turn determining into which DRAM bank the data is written.

24. Apparatus as claimed in claim 23 and in which operable means is provided, following the writing of the message sent by a system I/O resource into the AMPIC DRAM array, for informing the destination system I/O resource for which the message is intended of both the existence of a message and the message address location within the AMPIC DRAM array.

25. Apparatus as claimed in claim 24 and in which means is provided for enabling the destination system I/O resource for which the message is intended, upon being so informed, to extract the message from the AMPIC DRAM array.

26. Apparatus as claimed in claim 25 wherein the message data is distributed across the entire AMPIC DRAM array, with each element of the array holding a portion of the data, with the complete signaling information of the massaging being sent to each individual element of the AMPIC DRAM array.

27. Apparatus as claimed in claim 24 and in which said logic circuits enable the size of the message to be also forwarded to the destination system I/O resource with the message address location.

28. Apparatus as claimed in claim 27 and in which said logic circuits cause the size of the message to be stored in the DRAM array when the message is written therein, with the size of the message being indicated to the destination system I/O resource by asserting a Data Valid signal for as long as is indicated by the message bit count.

29. Apparatus as claimed in claim 24 and in which means is provided for causing the destination system I/O resource, upon receiving the address location of the message, to drive the address location into each of the AMPIC DRAMs.

30. Apparatus as claimed in claim 25 and in which the extracting of the message is effected once the address location of the message has been driven into each of the AMPIC DRAMs by means for reading its portion of the message data out of each AMPIC DRAM of the array, and forwarding the message on to the destination I/O resource.

31. Apparatus as claimed in claim 29 and in which the message is sent to several destination system I/O resources as a multicast message, and, upon recognizing that the same DRAM address has been received from each of the multicast message system I/O resources, a single DRAM read cycle is executed.

32. Apparatus as claimed in claim 23 and in which the message bit address location information is logically partitioned in the DRAM array into a plurality of similar sections.

33. Apparatus as claimed in claim 32 and in which link address bits are included in the message address location information linking parts of messages larger than the section.

34. Apparatus as claimed in claim 33 and in which, when, during the read out of the messages from the successive sections of the array, the link address in one section does not point to another section, then entire message has been read out.

35. Apparatus as claimed in claim 32 and in which the sections size is programmed to a range of variable size values to accommodate for both relatively small and large messages.

36. Apparatus as claimed in claim 23 and in which messages are stored in the DRAM array back-to-back irrespective of message size, with different-size messages accordingly distributed throughout the array.

37. Apparatus as claimed in claim 23 and in which the passing of addresses between the system I/O resources is effected by logic circuits external to the AMPIC DRAM.

38. Apparatus as claimed in claim 23 and in which relatively short messages are employed as in ATM networking, and the incoming message data from a system I/O resource is streamed into a slot of the system I/O resource data port; and wherein, if other system I/O resources have filled different slots of their corresponding data ports with similarly short messages, means is provided for transferring all the messages to the DRAM at the same time, enabling efficient utilization of said data buses.

* * * * *